(12) United States Patent
Yamato (10) Patent No.: US 9,822,815 B2
(45) Date of Patent: Nov. 21, 2017

(54) HYDROSTATIC BEARING APPARATUS, MACHINE-TOOL MAIN-SPINDLE APPARATUS INCLUDING HYDROSTATIC BEARING APPARATUS, AND METHOD FOR MANUFACTURING HYDROSTATIC BEARING APPARATUS

(71) Applicant: JTEKT Corporation, Osaka-shi (JP)

(72) Inventor: Hiroki Yamato, Kariya (JP)

(73) Assignee: JTEKT CORPORATION, Osaka-shi (JP)

( * ) Notice: Subject to any disclaimer, the term of this patent is extended or adjusted under 35 U.S.C. 154(b) by 22 days.

(21) Appl. No.: 15/002,074

(22) Filed: Jan. 20, 2016

(65) Prior Publication Data

US 2016/0215818 A1    Jul. 28, 2016

(30) Foreign Application Priority Data

Jan. 23, 2015  (JP) ................................ 2015-011584

(51) Int. Cl.
*F16C 32/06*   (2006.01)
*B23P 15/00*   (2006.01)
*B23P 11/02*   (2006.01)

(52) U.S. Cl.
CPC ........ *F16C 32/0659* (2013.01); *B23P 15/003* (2013.01); *F16C 32/0685* (2013.01); *B23P 11/025* (2013.01); *F16C 2322/39* (2013.01)

(58) Field of Classification Search
CPC .............. F16C 32/0633; F16C 32/0651; F16C 32/0659; F16C 32/0662; F16C 32/0666; F16C 32/0685
See application file for complete search history.

(56) References Cited

U.S. PATENT DOCUMENTS

| | | | | |
|---|---|---|---|---|
| 3,347,605 A | * | 10/1967 | Le Nabour | F16C 32/0659 384/118 |
| 4,307,918 A | * | 12/1981 | Mohsin | F16C 32/0659 384/100 |
| 4,426,118 A | * | 1/1984 | Mohsin | F16C 32/064 384/12 |
| 5,484,208 A | * | 1/1996 | Kane | F16C 29/025 384/12 |
| 6,474,867 B1 | * | 11/2002 | Perrone, Jr. | F16C 32/06 384/12 |
| 6,761,483 B1 | * | 7/2004 | Michiels | F16C 32/064 384/107 |

FOREIGN PATENT DOCUMENTS

JP    2001-304260    10/2001

* cited by examiner

*Primary Examiner* — James Pilkington
(74) *Attorney, Agent, or Firm* — Oblon, McClelland, Maier & Neustadt, L.L.P.

(57) ABSTRACT

A hydrostatic bearing apparatus includes a bearing metal having a hydrostatic portion that allows a grinding wheel shaft to be rotatably supported. The hydrostatic portion has a bearing clearance, a bearing surface portion, a plurality of pockets, and partition plates. Clearances are each formed between the corresponding partition plate and an edge of the corresponding pocket in a rotating direction of the grinding wheel shaft. The clearances are formed in the pocket at upstream and downstream ends in the rotating direction. The bearing clearance has a first bearing clearance and a second bearing clearance. The second bearing clearance is larger than the first bearing clearance.

11 Claims, 6 Drawing Sheets

HYDROSTATIC BEARING APPARATUS, MACHINE-TOOL MAIN-SPINDLE APPARATUS INCLUDING HYDROSTATIC BEARING APPARATUS, AND METHOD FOR MANUFACTURING HYDROSTATIC BEARING APPARATUS

INCORPORATION BY REFERENCE

The disclosure of Japanese Patent Application No. 2015-011584 filed on Jan. 23, 2015 including the specification, drawings and abstract, is incorporated herein by reference in its entirety.

BACKGROUND OF THE INVENTION

1. Field of the Invention

The present invention relates to a hydrostatic bearing apparatus, a machine-tool main-spindle apparatus including a hydrostatic bearing apparatus, and a method for manufacturing a hydrostatic bearing apparatus.

2. Description of Related Art

Hydrostatic bearing apparatuses have been known in which a rotating shaft such as a main spindle of a machine tool which rotates at high speed is supported by a hydrostatic pressure of a pressurized fluid such as a lubricating solution. For example, Japanese Patent Application Publication No. 2001-304260 (JP 2001-304260 A) discloses a technique for a hydrostatic bearing apparatus including a bearing metal with a hydrostatic portion that supports the rotating shaft such that the rotating shaft rotatable is rotatable. According to this technique, the hydrostatic portion has a bearing surface portion with a bearing clearance between the bearing surface portion and a surface of the rotating shaft and a plurality of pockets recessed in the bearing surface portion adjacently to one another in a circumferential direction of the bearing surface portion. A fluid such as a lubricating solution is fed into the pockets to support the rotating shaft by fluid pressure (static pressure).

Figure 9:
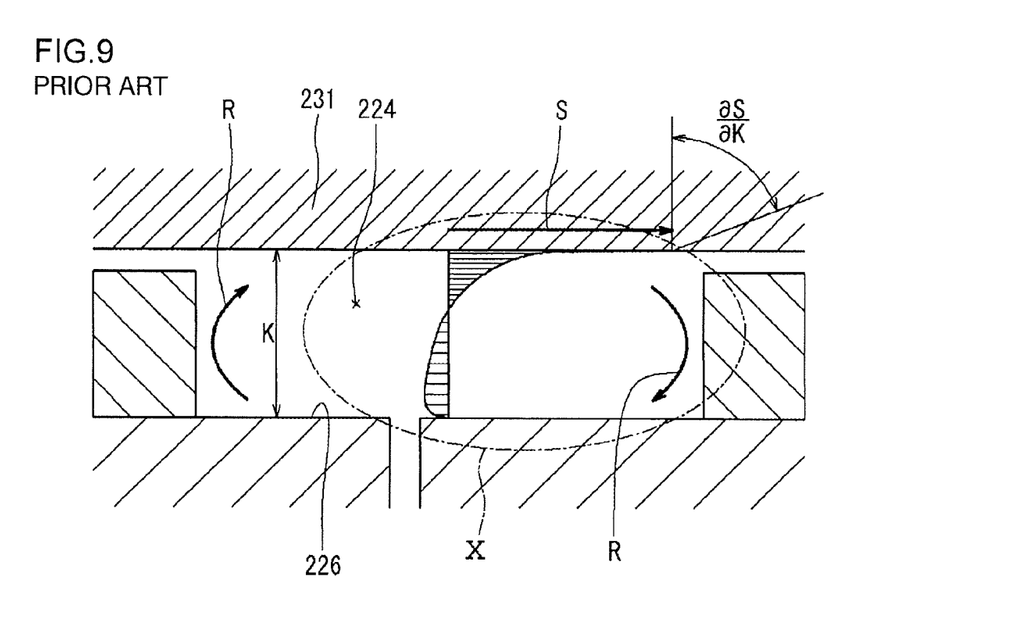
FIG. 9 is a velocity distribution diagram for a flow of a lubricating solution in a conventional pocket.
Figure 10:
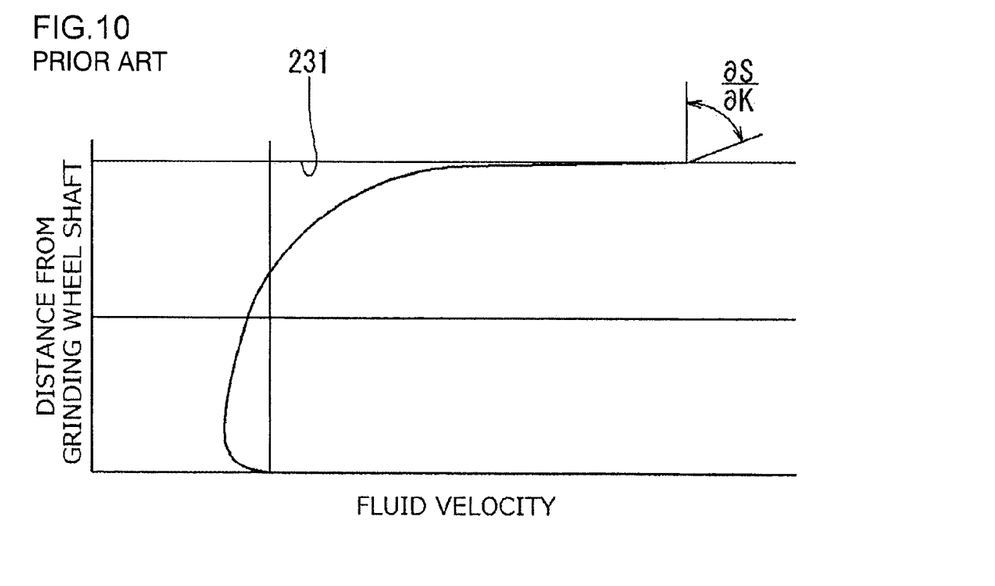
FIG. 10 is a diagram depicting the flow of a lubricating solution in the conventional pocket.

However, the lubricating solution used for the hydrostatic bearing apparatus is subjected to a flow resulting from what is called entrainment in the pockets due to rotation of the rotating shaft as depicted in FIG. 9 and FIG. 10. The lubricating solution forms a flow in a rotating direction of the rotating shaft and a flow occurring at a bottom portion of each of the pockets in a direction opposite to the rotating direction of the rotating shaft. Accordingly, in the hydrostatic bearing apparatus, a large velocity gradient may be formed near the surface of the rotating shaft, and a power loss may result from high fluid shearing resistance. A strong turbulent flow with a Reynolds number of 20,000 to 30,000 occurs inside the pocket, and thus, a large velocity gradient may be formed near the surface of the rotating shaft, and a power loss may result from high fluid shearing resistance. This trend is more significant as the rotating shaft rotates at high speed.

SUMMARY OF THE INVENTION

An object of the present invention is to suppress a possible increase in a velocity gradient of a fluid in pockets in a hydrostatic bearing apparatus in order to reduce a power loss.

A hydrostatic bearing apparatus in an aspect of the present invention includes a rotating shaft and bearing metal with a hydrostatic portion that allows the rotating shaft to be rotatably supported. The hydrostatic portion has a bearing clearance disposed between a surface of the rotating shaft and the bearing metal and filled with a lubricating solution, a bearing surface portion that faces the surface of the rotating shaft, a plurality of pockets recessed in the bearing surface portion adjacently to one another in a circumferential direction of the bearing surface portion, and partition plates each housed in a corresponding one of the pockets and partitioning a bottom portion of the pocket from the surface of the rotating shaft. Clearances are each formed between the partition plate and an edge of the pocket in a rotating direction of the rotating shaft, the clearances are formed in the pocket at upstream and downstream ends in the rotating direction, and the bearing clearance has a first bearing clearance between the surface of the rotating shaft and the bearing surface portion and a second bearing clearance between the surface of the rotating shaft and the partition plate. The second bearing clearance is configured to be larger than the first bearing clearance.

In the hydrostatic bearing apparatus in this aspect, the hydrostatic portion has the partition plates each housed in the corresponding pocket to partition the bottom portion of the pocket from the surface of the rotating shaft. The hydrostatic portion further has the clearances formed in the pocket at the upstream and downstream ends in the rotating direction. Thus, the configuration of the partition plate allows the flow of the lubricating solution to be regulated so as to make a flow in the rotating direction of the rotating shaft and a flow occurring at the bottom portion of the pocket in a direction opposite to the rotating direction of the rotating shaft less likely to affect each other. Consequently, a possible increase in a velocity gradient of a fluid in the pocket in the hydrostatic bearing apparatus is suppressed, enabling a reduction in power loss.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

A hydrostatic bearing apparatus, a machine-tool main-spindle apparatus including a hydrostatic bearing apparatus, and a method for manufacturing a hydrostatic bearing apparatus will be described below using the drawings, as an embodiment in which the present invention is implemented.

Figure 1:
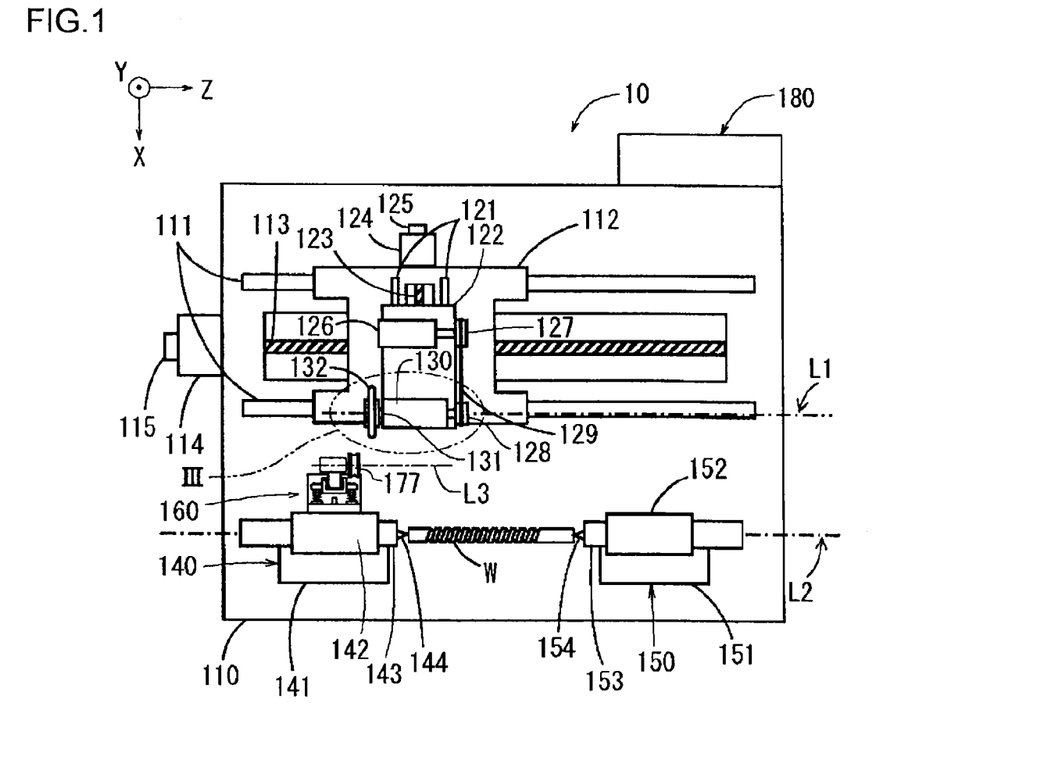
FIG. 1 is a plan view depicting a general configuration of a grinding machine taken as an example of a machine-tool main-spindle apparatus including a hydrostatic bearing apparatus according to an embodiment.
Figure 2:
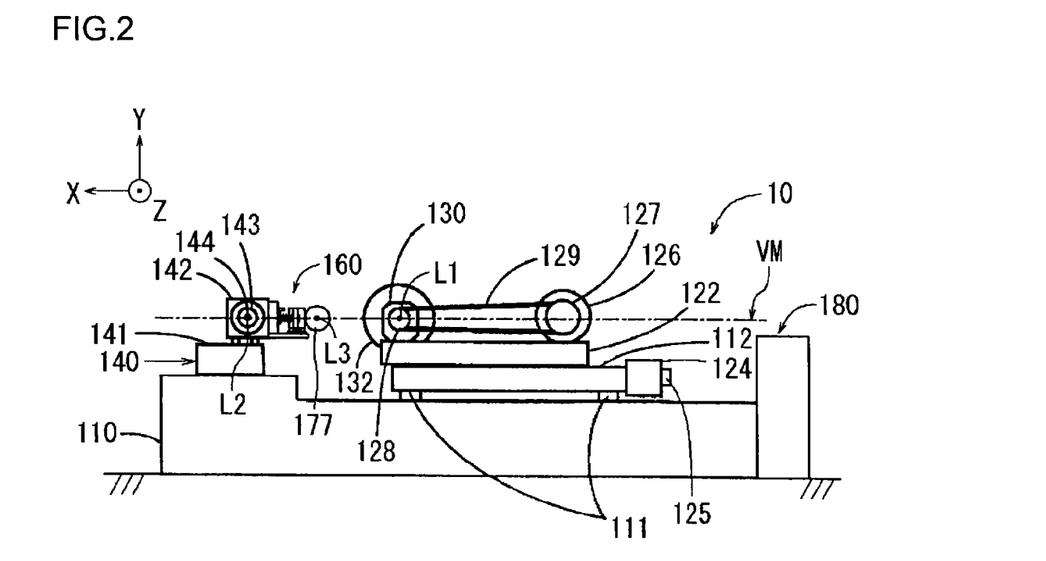
FIG. 2 is a right side view of the grinding machine depicted in FIG. 1.

FIG. 1 is a plan view depicting a general configuration of a grinding machine 10 as an example of a machine-tool main-spindle apparatus including a hydrostatic bearing apparatus according to an embodiment. FIG. 2 is a right side view of the grinding machine 10. In FIG. 2, illustration of a workpiece holding apparatus 150 including a holding table 151 is omitted. In all drawings depicting an X axis, a Y axis, and a Z axis, the X axis, the Y axis, and the Y axis are orthogonal to one another, the Y axis represents a vertically upward direction, and the Z axis and the X axis represent a horizontal direction. The Z axis direction represents a direction parallel to a grinding wheel rotation axis L1 (in other words, a workpiece rotation axis direction). The X axis direction represents a direction that is orthogonal to the grinding wheel rotation axis L1 and in which a grinding wheel 132 cuts into a workpiece W. The grinding wheel rotation axis L1, a workpiece rotation axis L2, and a truer rotation axis L3 are all parallel to the Z axis direction.

The grinding machine 10 depicted in FIG. 1 and FIG. 2 is configured to grind the workpiece W by controllably moving the grinding wheel 132 relative to the workpiece W in the X axis direction and the Z axis direction. In a substantially central portion on a base 110 formed to be planarly rectangular, a Z axis direction slide table 112 is disposed which is slidably guided along a pair of Z axis direction guide rails 111 extending in the Z axis direction. The Z axis direction slide table 112 is slid in the Z axis direction by a rotating operation of a Z axis direction feed screw 113 operated using, as a driving source, a Z axis driving motor 114 operationally controlled by a control apparatus 180 (NC control apparatus or the like). The Z axis driving motor 114 is provided with a Z axis direction position detection apparatus 115 such as an encoder, which detects a rotation angle of an output shaft of the Z axis driving motor 114 and which sends a corresponding detection signal to the control apparatus 180, in order to determine the position of the Z axis direction slide table 112 in the Z axis direction. The control apparatus 180 can move the grinding wheel 132 in the Z axis direction relative to the truer 177 or the workpiece W using the Z axis driving motor 114, to detect a moving distance of the grinding wheel 132 in the Z axis direction relative to the truer 177 or the workpiece W based on the detection signal from the Z axis direction position detection apparatus 115.

On the Z axis direction slide table 112, an X axis direction slide table 122 is disposed which is slidably guided along a pair of X axis direction guide rails 121 extending in the X axis direction. The X axis direction slide table 122 is slid in the X axis direction by a rotating operation of an X axis direction feed screw 123 operated using, as a driving source, an X axis driving motor 124 operationally controlled by the control apparatus 180. The X axis driving motor 124 is provided with an X axis direction position detection apparatus 125 such as an encoder, which detects a rotation angle of an output shaft of the X axis driving motor 124 and which sends a corresponding detection signal to the control apparatus 180, in order to determine the position of the X axis direction slide table 122 in the X axis direction. The control apparatus 180 can move the grinding wheel 132 in the X axis direction relative to the truer 177 or the workpiece W using the X axis driving motor 124, to detect the moving distance of the grinding wheel 132 in the X axis direction relative to the truer 177 or the workpiece W based on the detection signal from the X axis direction position detection apparatus 125.

A grinding wheel driving motor 126 and a grinding wheel shaft holder 130 are each disposed on the X axis direction slide table 122. A driving pulley 127 is provided over an output shaft of the grinding wheel driving motor 126. A driven pulley 128 is provided over an end of a grinding wheel shaft 131 (a grinding wheel shaft that rotates around the grinding wheel rotation axis L1 parallel to the Z axis direction) in its axial direction. The grinding wheel shaft 131 is provided with the generally cylindrical grinding wheel 132 at the other end in its axial direction. A belt 129 is looped between the driving pulley 127 and the driven pulley 128 to transmit a torque of the output shaft of the grinding wheel driving motor 126 to the grinding wheel shaft 131 via the belt 129.

On the base 110, a workpiece holding apparatus 140 and a workpiece holding apparatus 150 are disposed on the workpiece rotation axis L2 parallel to the Z axis direction. The workpiece holding apparatuses 140 and 150 hold the shaft-like workpiece W at a set position while rotating the workpiece W around the workpiece rotation axis L2 that extends in the Z axis direction. The workpiece holding apparatus 140 includes a holding table 141 fixed on the base 110, a holding shaft housing 142 that can reciprocate on the workpiece rotation axis L2 relative to the holding table 141, and a holding shaft member 143 supported in the holding shaft housing 142 so as to be rotatable around the workpiece rotation axis L2. A center member 144 is provided at a tip of the holding shaft member 143 to support a central portion of an end surface of the workpiece W. The holding shaft member 143 is controllably rotated to any angle at any angular speed using, as a driving source, a holding shaft motor (not depicted in the drawings) operationally controlled by the control apparatus 180. Like the workpiece holding apparatus 140, the workpiece holding apparatus 150 includes a holding table 151, a holding shaft housing 152, a holding shaft member 153, and a center member 154. The holding shaft housing 142 is provided with a truing apparatus 160 including a truer 177 supported so as to be rotatable around a truer rotation axis L3. As depicted in FIG. 2, the grinding wheel rotation axis L1, the workpiece rotation axis L2, and the truer rotation axis L3 are all on a virtual plane VM that is a plane parallel to the X axis direction and the Z axis direction.

As described above, the grinding machine 10 moves the grinding wheel 132 in the Z axis direction and the X axis direction relative to the workpiece W or the truer 177 to grind the workpiece W or appropriately externally reshape the grinding wheel 132 using the truer 177.

Figure 3:
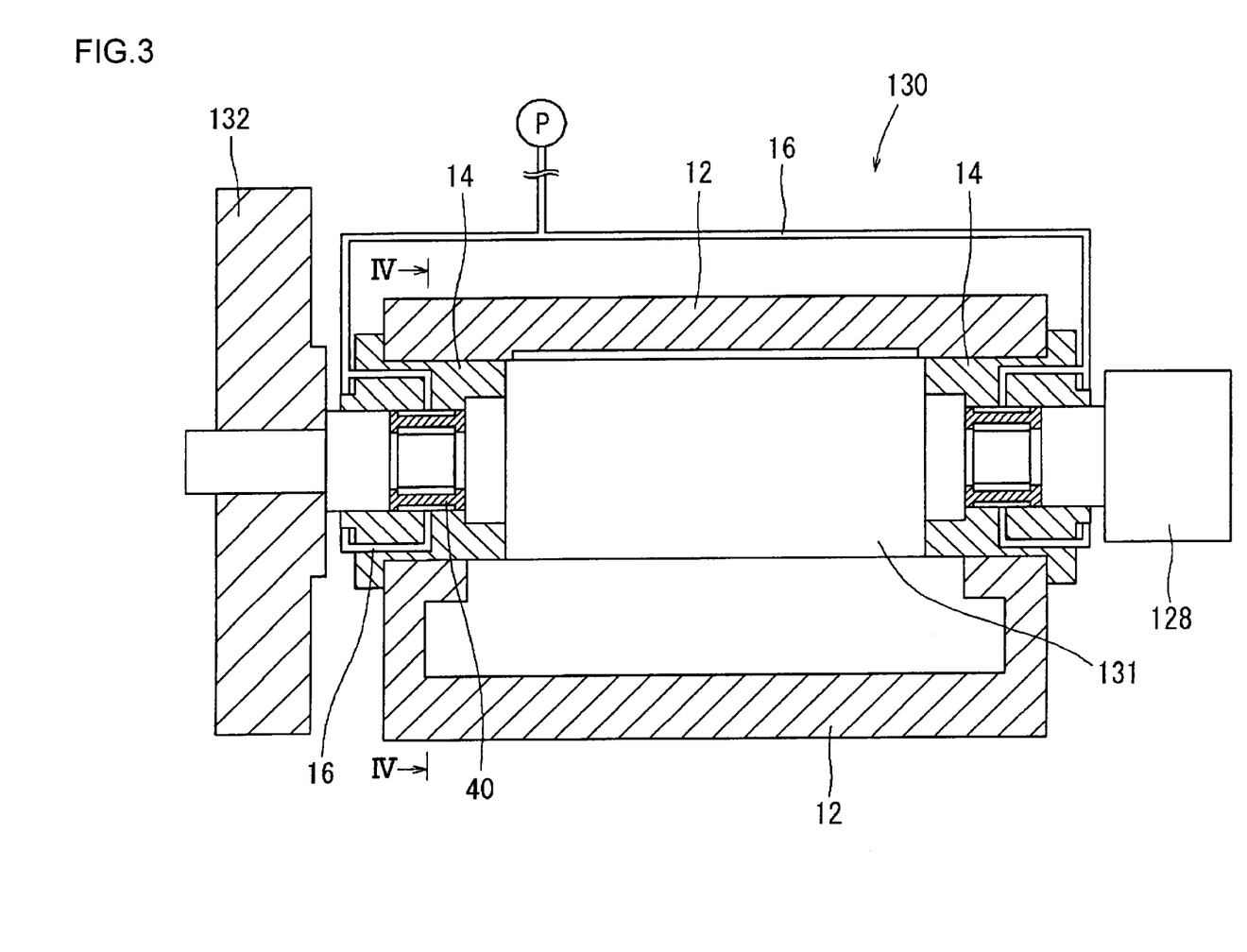
FIG. 3 is an enlarged sectional view of a portion III in FIG. 1.
Figure 4:
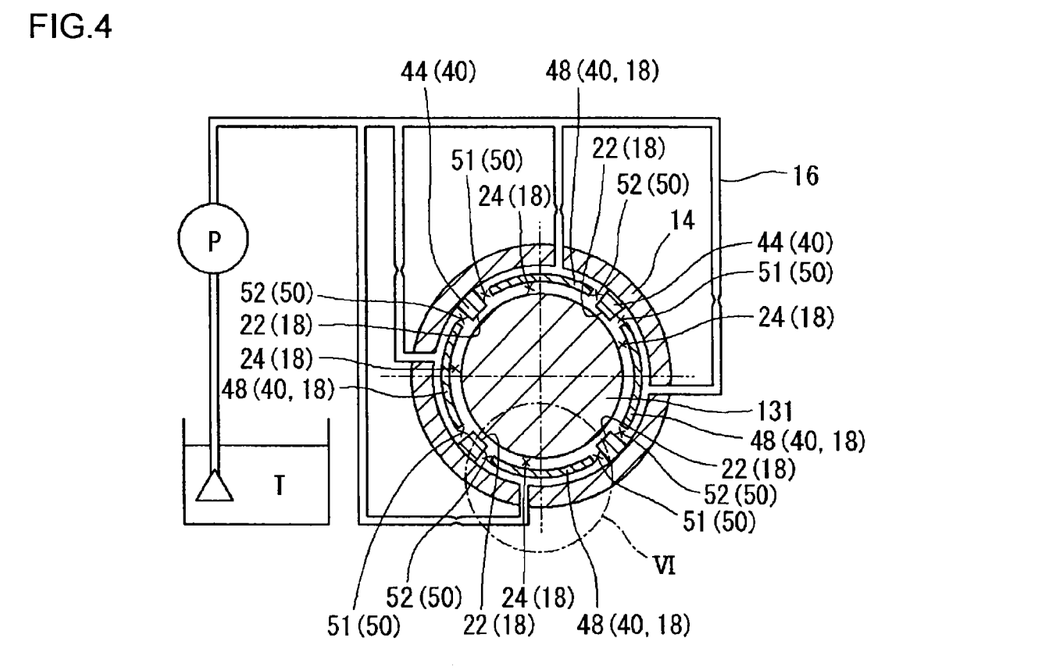
FIG. 4 is a sectional view taken along line IV-IV in FIG. 3.
Figure 5:
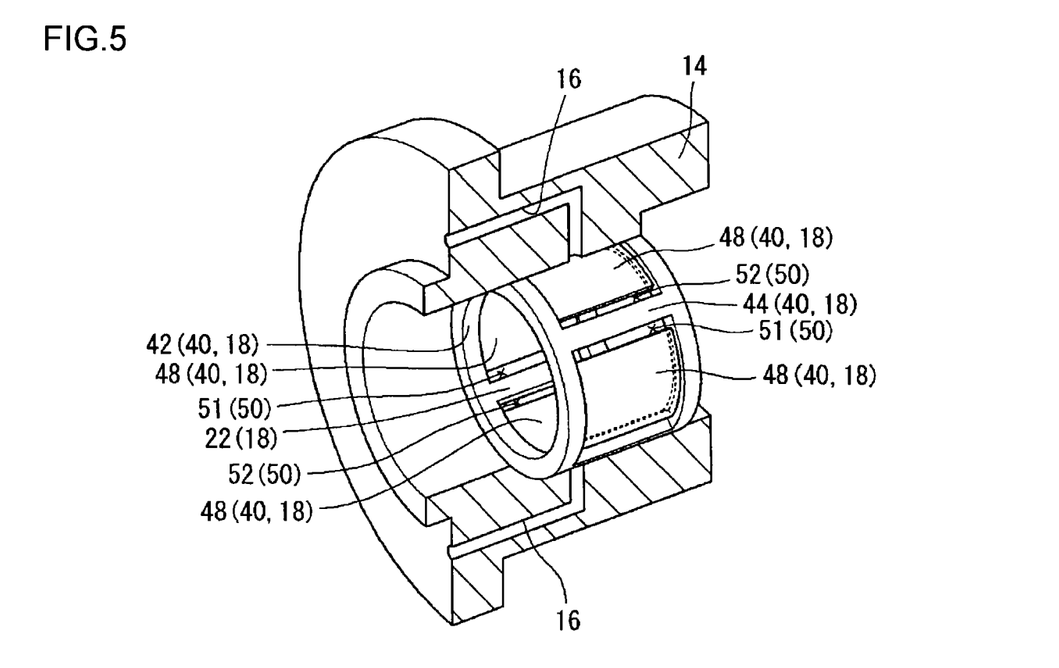
FIG. 5 is a perspective view depicting a tubular member assembled into a bearing metal.
Figure 6:
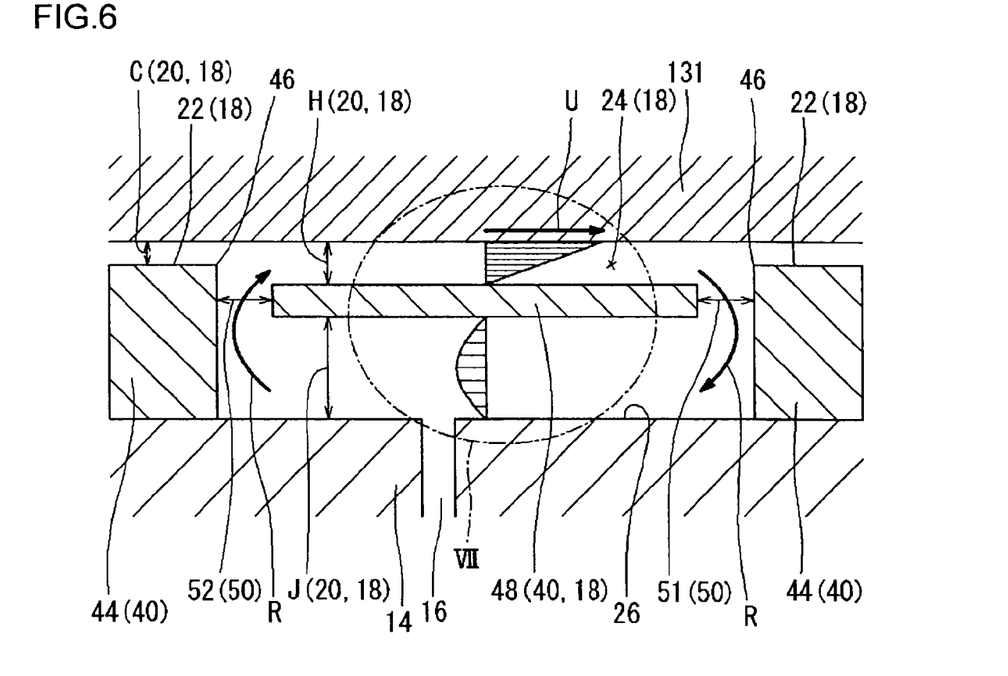
FIG. 6 is an enlarged sectional view of a portion VI in FIG. 4, depicting a flow of a lubricating solution in a pocket.
Figure 7:
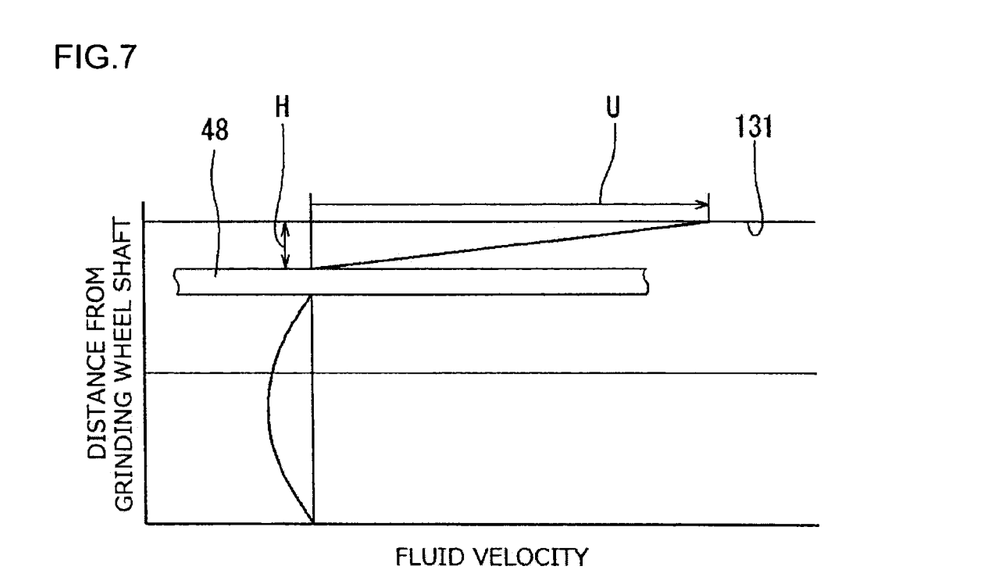
FIG. 7 is a velocity distribution diagram for the flow of the lubricating solution in the pocket.

FIG. 3 is an enlarged sectional view (a portion III in FIG. 1) of the grinding wheel shaft holder 130. FIG. 4 is a sectional view taken along line IV-IV in FIG. 3. FIG. 5 is a perspective view depicting a cylindrical member assembled into the bearing metal. In FIG. 5, the bearing metal 14 is partly cut out to expose a cylindrical member 40 inside the bearing metal 14. FIG. 6 is an enlarged sectional view of a portion VI in FIG. 4 and depicting a flow of a lubricating solution in a pocket. The grinding wheel shaft holder 130 has a grinding wheel shaft housing 12 and a bearing metal 14 fixed in the grinding wheel shaft housing 12 as depicted in FIG. 3. The grinding wheel shaft 131 (rotating shaft) is rotatably supported by the bearing metal 14. As depicted in FIG. 4, the bearing metal 14 has a hydrostatic portion 18 that allows the grinding wheel shaft 131 to be rotatably supported with fluid pressure (static pressure) of a fluid, such as a lubricating solution R, fed from a pump P (see FIG. 4) or the like into the bearing metal 14 via a channel 16. The bearing metal 14 is configured as a steel tube as depicted in FIG. 5. The hydrostatic portion 18 includes a bearing clearance 20, a bearing surface portion 22, a plurality of pockets 24, and partition plates 48 all formed on an inner peripheral surface side of the bearing metal 14 as depicted in FIG. 6. The lubricating solution R is desirably water, or a water solution in which 90% or more of its composition is water, or low-viscosity mineral oil.

The bearing surface portion 22 is a surface facing a surface of the grinding wheel shaft 131 as depicted in FIG. 5 and FIG. 6. The pockets 24 are areas in which the lubricating solution R fed from the pump P or the like via the channel 16 is stored. The plurality of separate pockets 24 is recessed in the bearing surface portion 22 of the bearing metal 14 adjacently to one another in a circumferential direction. In the present embodiment, the lubricating solution R is fed into each of the four pockets 24 via the channel 16. The number of the pockets 24 is not limited to four. The fluid flowing out from the pockets 24 and axial pockets (not depicted in the drawings) after being used to hydrostatically support the grinding wheel shaft 131 in the pockets is collected via a drain (not depicted in the drawings), cooled by an oil cooler or the like, and then returned to a tank T (see FIG. 4). Each of the partition plates 48 is a plate member housed in the corresponding pocket 24 to partition a bottom portion 26 of the pocket 24 from the surface of the grinding wheel shaft 131. The bearing clearance 20 is a space disposed between the surface of the grinding wheel shaft 131 and an inner peripheral surface of the bearing metal 14 and filled with the lubricating solution R. The bearing clearance 20 has a first bearing clearance C between the surface of the grinding wheel shaft 131 and the bearing surface portion 22, a second bearing clearance H between the surface of the grinding wheel shaft 131 and the partition plate 48, and a third bearing clearance J between the bottom portion 26 of the pocket 24 and the partition plate 48. The size of second bearing clearance H is configured to be larger than the size of the first bearing clearance C.

On an inner surface of the bearing metal 14, the cylindrical member 40 is provided which is separate from the bearing metal 14 and formed of a material that is different from a material of the bearing metal 14 and that has a lower strength than the material of the bearing metal 14. The material of the cylindrical member 40 is, for example, gunmetal. The gunmetal is a type of copper alloy and is an alloy of copper and tin. The gunmetal is excellent in toughness and easy to manufacture, and appropriately resists wear and corrosion. The gunmetal also has a lower strength than the bearing metal 14 located radially outward thereof and formed of iron steel. An outer peripheral surface and an inner peripheral surface of the cylindrical member 40 are cut so as to form annular sections 42 disposed at opposite ends in the axial direction, a plurality of pillar sections 44 arranged at intervals in the circumferential direction so as to couple the annular sections 42 at the opposite ends in the axial direction, a plurality of pockets 24 defined by the pillar sections 44, and the circular-arc-shaped partition plates 48 in the pockets 24. The cylindrical member 40 resulting from the cutting is fitted into the bearing metal 14 by shrinkage fitting. Combination of the bearing metal 14 and the cylindrical member 40 forms the hydrostatic portion 18 having the bearing clearance 20 disposed between the surface of the grinding wheel shaft 131 and the bearing metal 14 and filled with the lubricating solution R, the bearing surface portion 22 facing the surface of the grinding wheel shaft 131, the plurality of pockets 24 recessed in the bearing surface portion 22 adjacently to one another in the circumferential direction of the bearing surface portion 22, and the partition plates 48 each housed in the corresponding pocket 24 to partition the bottom portion 26 of the pocket 24 from the surface of the grinding wheel shaft 131.

Clearances 50 are each formed between the partition plate 48 and an edge 46 of the pocket 24 (in other words, an edge of the pillar section 44) in the rotating direction of the grinding wheel shaft 131. In other words, the clearances 50 are openings that penetrate the partition plate 48 to extend between the grinding wheel shaft 131 and the bottom portion 26 of the pocket 24. The clearances 50 are each formed as a slit that extends parallel to the axial direction of the grinding wheel shaft 131. The slits include a first slit 51 and a second slit 52 located downstream and upstream, respectively, in the rotating shaft of the grinding wheel shaft 131. The first slit 51 and the second slit 52 are formed to have an opening width larger than the second bearing clearance H.

The grinding wheel shaft 131 is supported with fluid pressure (static pressure) of a fluid, such as the lubricating solution R, fed into the pockets 24. In this regard, when the density of the lubricating solution R is denoted by ρ, the viscosity coefficient of the lubricating solution R is denoted by μ, the peripheral velocity of the grinding wheel shaft 131 is denoted by U, and the size of the second bearing clearance is denoted by H, a Reynolds number Re for the second bearing clearance H is expressed by Re=ΣUH/μ. The peripheral velocity U of the grinding wheel shaft 131 is set, for example, based on a design standard specification speed for the grinding wheel shaft 131, an estimated frequently-used rotation speed and average speed, a specification speed based on machining conditions, and the like. The size of the second bearing clearance H is set such that for a flow of the lubricating solution R occurring when the grinding wheel shaft 131 is rotatably supported, Re<2000. The lubricating solution R flowing through the second bearing clearance H when the grinding wheel shaft 131 is rotatably supported forms a laminar flow along the rotating direction of the grinding wheel shaft 131. A portion of the laminar flow of the lubricating solution R moves into the third bearing clearance J through the second slit 52 to form a flow toward the first slit 51. That is, the lubricating solution R flowing through the third bearing clearance J between the bottom portion 26 of the pocket 24 and the partition plate 48 forms a flow in a direction opposite to the rotating direction of the grinding wheel shaft 131.

In this regard, the lubricating solution R in a conventional pocket 224 not having the partition plate 48 is subjected to a flow resulting from what is called entrainment in the pocket 224 due to rotation of a grinding wheel shaft 231 as depicted in FIGS. 9 and 10. The lubricating solution R forms a flow in the rotating direction of the grinding wheel shaft 231 and a flow occurring near the bottom portion 226 of the pocket 224 in a direction opposite to the rotating direction of the grinding wheel shaft 231. Accordingly, in the hydrostatic bearing apparatus, a large velocity gradient may be formed near the surface of the grinding wheel shaft 231, and a power loss may result from high fluid shearing resistance. In a situation where the lubricating solution R in the bearing forms a strong turbulent flow with a Reynolds number of 20,000 to 30,000, when the depth of the pocket is denoted by K and the peripheral velocity of the grinding wheel shaft 231 is denoted by S, the velocity gradient of the flow of the lubricating solution R is expressed by ∂S/∂K. In this regard, for the viscosity coefficient μ of the lubricating solution R, a shearing force τ1 exerted on the grinding wheel shaft 231 is expressed by τ1=μ×(∂S/∂K). When the opening area of the pocket 224 is denoted by A, a power loss P1 imposed on the grinding wheel shaft 231 by the lubricating solution R in the pocket 224 is expressed by P1=S×τ1×A. Given that the peripheral velocity S of the grinding wheel shaft 231 and the opening area A of the pocket 224 have fixed values, the shearing force τ1 contributes to the power loss P1. When changes in the temperature of the lubricating solution R are constant, the viscosity coefficient μ is constant. Consequently, the velocity gradient ∂S/∂K at τ1 is a factor that contributes to the power loss P1.

On the other hand, in a situation where the lubricating solution R in the bearing forms a laminar flow as depicted in FIG. 6, the velocity gradient can be approximated to U/H. A shearing force τ2 exerted on the grinding wheel shaft 131 is expressed by τ2=μ×(U/H). When the opening area of the pocket 24 is denoted by A, a power loss P2 imposed on the grinding wheel shaft 131 by the lubricating solution R in the pocket 24 is expressed by P2=U×τ2×A. Given that the peripheral velocity U of the grinding wheel shaft 131 and the opening area A of the pocket 24 have fixed values, the shearing force τ2 contributes to the power loss P2. When changes in the temperature of the lubricating solution R are constant, the viscosity coefficient μ is constant. Consequently, τ2 is a factor that causes H of the velocity gradient U/H to contribute to the power loss P2.

Figure 8:
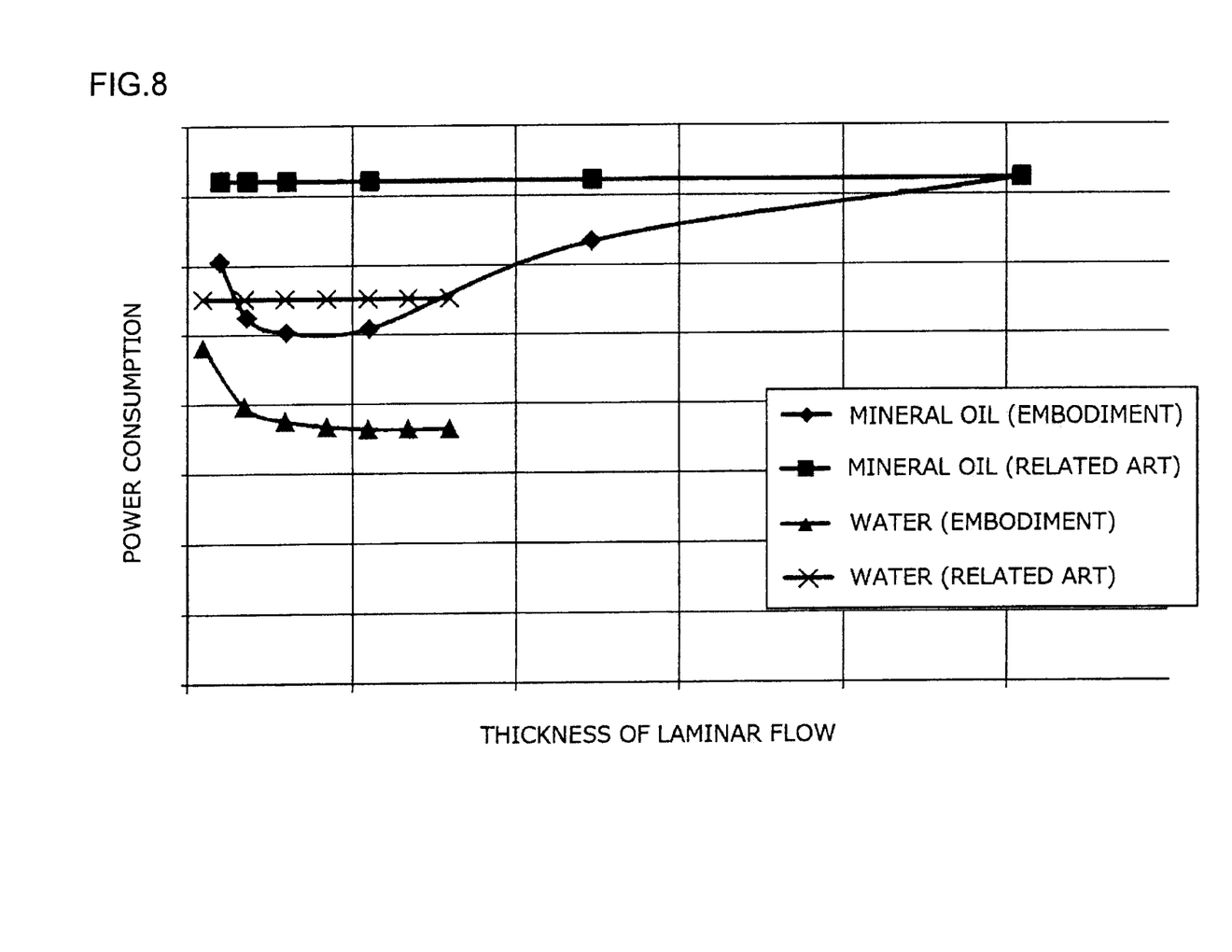
FIG. 8 is a diagram illustrating power consumption of the hydrostatic bearing apparatus.

Thus, the partition plates 48 are adopted for the hydrostatic portion 18 in the present embodiment in order to cause a laminar flow near the surface of the grinding wheel shaft 131, while separating the flow in the rotating direction of the grinding wheel shaft 131 from the flow occurring at the bottom portion 26 of the pocket 24 in the direction opposite to the rotating direction of the grinding wheel shaft 131, so as to prevent the flows from affecting each other. The size of second bearing clearance H between the partition plate 48 and the surface of the grinding wheel shaft 131 is set to a maximum value to the extent that the laminar flow can be maintained. Due to this configuration of the partition plate 48, the bearing clearance 20 in the pocket 24 has the first bearing clearance C between the surface of the grinding wheel shaft 131 and the bearing surface portion 22, the second bearing clearance H between the surface of the grinding wheel shaft 131 and the partition plate 48, and the third bearing clearance J between the bottom portion 26 of the pocket 24 and the partition plate 48. The size of the second bearing clearance H is configured to be larger than the size of the first bearing clearance C. As a result, the lubricating solution R flowing through the second bearing clearance H with the grinding wheel shaft 131 rotatably supported forms a laminar flow along the rotating direction of the grinding wheel shaft 131, and the lubricating solution R flowing through the third bearing clearance J between the bottom portion 26 of the pocket 24 and the partition plate 48 forms a flow in the direction opposite to the rotating direction. Thus, as depicted in FIG. 8, power consumption was reduced regardless of whichever of water, a water solution, and low-viscosity mineral oil was used as the lubricating solution R.

In the hydrostatic bearing apparatus in the embodiment, the hydrostatic portion 18 has the partition plates 48 each housed in the corresponding pocket 24 to partition the bottom portion 26 of the pocket 24 from the surface of the grinding wheel shaft 131. The hydrostatic portion 18 further has the clearances 50 formed in the pocket 24 at the upstream and downstream ends in the rotating direction. Thus, the flow of the lubricating solution R is regulated by the partition plate 48 such that the flow in the rotating direction of the grinding wheel shaft 131 and the flow occurring at the bottom portion 26 of the pocket 24 in the direction opposite to the rotating direction of the grinding wheel shaft 131 are less likely to affect each other. Consequently, a possible increase in a velocity gradient of a fluid in the pocket 24 in the hydrostatic bearing apparatus is suppressed, enabling a reduction in power loss.

The Reynolds number Re for the second bearing clearance H between the surface of the grinding wheel shaft 131 and the partition plate 48 is expressed by Re=ρUH/μ, and for the flow of the lubricating solution R occurring through the second bearing clearance H when the grinding wheel shaft 131 is rotatably supported, Re<2000. That is, high fluid shearing resistance is less likely to occur in conjunction with the flow of the lubricating solution R through the second bearing clearance H, which allows a power loss to be suppressed.

The slits includes the first slit 51 and the second slit 52 that are located downstream and upstream, respectively, in the rotating direction of the grinding wheel shaft 131. The first slit 51 and the second slit 52 have an opening width larger than the second bearing clearance H. Thus, the lubricating solution R flowing through the second bearing clearance H can be allowed to move smoothly toward the bottom portion 26 of the pocket 24.

The lubricating solution R is suitably water, or a water solution in which 90% or more of the composition is water, or low-viscosity mineral oil.

The lubricating solution R flowing through the second bearing clearance H forms a laminar flow along the rotating direction of the grinding wheel shaft 131, and the lubricating solution R flowing through the third bearing clearance J between the bottom portion 26 of the pocket 24 and the partition plate 48 forms a flow in the direction opposite to the rotating direction of the grinding wheel shaft 131. The partition plate 48 partitions the laminar flow through the second bearing clearance H from the flow through the third bearing clearance J in the direction opposite to the rotating direction. This makes the laminar flow and the flow through the third bearing clearance J less likely to affect each other. Therefore, a possible increase in the velocity gradient of the fluid in the pocket 24 is suppressed, enabling a further reduction in power loss.

The partition plate 48 and the bearing metal 14 are provided separately from each other. Thus, the partition plate 48 can be easily exclusively replaced. Even if the hydrostatic bearing is affected by a force from the grinding wheel shaft 131 in a radial direction and is, for example, worn off, the partition plate 48 can be exclusively replaced. This eliminates the need to replace all of the bearing metal 14.

The partition plate 48 is formed of a material that is different from the material of the bearing metal 14 and that has a lower strength than the material of the bearing metal 14. This configuration can reduce adverse effects such as wear on the grinding wheel shaft 131 when the grinding wheel shaft 131 and the partition plate 48 come into contact with each other due to a load or the like, compared to a configuration in which the partition plate 48 is formed of the same material as that of the bearing metal 14. The grinding wheel shaft 131 is often precisely machined in order to increase rotational accuracy. Thus, replacement of the grinding wheel shaft 131 tends to be expensive. However, the present embodiment can make the grinding wheel shaft 131 less likely to be damaged or worn off.

The hydrostatic bearing apparatus configured as described above is suitably used for a machine-tool main-spindle apparatus.

An outer peripheral surface and an inner peripheral surface of the metallic cylindrical member 40 are cut so as to form the annular sections 42 disposed at the opposite ends in the axial direction, the plurality of pillar sections 44 arranged at intervals in the circumferential direction so as to couple the annular sections 42 at the opposite ends in the axial direction, the plurality of pockets 24 defined by the pillar sections 44, and the circular-arc-shaped partition plates 48 in the pockets 24. Then, the cylindrical member 40 resulting from the cutting is fitted, by shrinkage fitting, into the bearing metal 14 that allows the grinding wheel shaft 131 to be rotatably supported. Consequently, the hydrostatic bearing apparatus can be manufactured. Such a manufacturing method is used to manufacture the hydrostatic bearing apparatus configured as described above.

The embodiment of the present invention has been described. However, the hydrostatic bearing apparatus, the machine-tool main-spindle apparatus including the hydrostatic bearing apparatus, and the method for manufacturing a hydrostatic bearing apparatus according to the present invention are not limited to the above-described embodiment and may be implemented in various other manners. For example, in the present embodiment, the form has been disclosed in which the bearing metal and the cylindrical member separate from the bearing metal are formed of the different materials. However, the present invention is not limited to the different materials but may include a form in which the bearing metal and the cylindrical member are formed of the same material.

What is claimed is:

1. A hydrostatic bearing apparatus comprising:
   a rotating shaft; and
   a bearing metal with a hydrostatic portion that allows the rotating shaft to be rotatably supported; wherein
   the hydrostatic portion has a bearing clearance disposed between a surface of the rotating shaft and the bearing metal and filled with a lubricating solution,
   a bearing surface portion faces the surface of the rotating shaft, a plurality of pockets are recessed in the bearing surface portion adjacently to one another in a circumferential direction of the bearing surface portion, and partition plates each housed in a corresponding one of the pockets and partition a bottom portion of the pocket from the surface of the rotating shaft,
   clearances are each formed between the partition plate and an edge of the pocket in a rotating direction of the rotating shaft,
   the clearances are formed in the pocket at upstream and downstream ends of the partition plate in the rotating direction,
   the bearing clearance includes a first bearing clearance between the surface of the rotating shaft and the bearing surface portion and a second bearing clearance between the surface of the rotating shaft and the partition plate, and
   the second bearing clearance is larger than the first bearing clearance,
   the clearances are each formed as a slit that extends parallel to an axial direction of the rotating shaft,
   the slit includes a first slit and a second slit that are located downstream and upstream, respectively, in the rotating direction of the rotating shaft, and
   the first slit and the second slit each have an opening width in the rotating direction larger than the second bearing clearance.

2. The hydrostatic bearing apparatus according to claim 1, wherein
   when a density of the lubricating solution is denoted by $\rho$,
   a viscosity coefficient of the lubricating solution is denoted by $\mu$,
   a peripheral velocity of the rotating shaft is denoted by U, and
   a size of the second bearing clearance is denoted by H,
   a Reynolds number for the second bearing clearance is expressed by $Re=\rho UH/\mu$, and
   for a flow of the lubricating solution occurring through the second bearing clearance when the rotating shaft is rotatably supported, $Re<2000$.

3. The hydrostatic bearing apparatus according to claim 1, wherein
   the lubricating solution is water, or a water solution in which 90% or more of its composition is water, or low-viscosity mineral oil.

4. The hydrostatic bearing apparatus according to claim 1, wherein
   the lubricating solution flowing through the second bearing clearance when the rotating shaft is rotatably supported forms a laminar flow along the rotating direction of the rotating shaft, and
   the lubricating solution flowing through a third bearing clearance between the bottom portion of the pocket and the partition plate forms a flow in a direction opposite to the rotating direction of the rotating shaft.

5. The hydrostatic bearing apparatus according to claim 1, wherein the partition plate and the bearing metal are provided separately from each other.

6. A machine-tool main-spindle apparatus comprising the hydrostatic bearing apparatus according to claim 1.

7. A hydrostatic bearing apparatus comprising:
   a rotating shaft; and
   a bearing metal with a hydrostatic portion that allows the rotating shaft to be rotatably supported; wherein
   the hydrostatic portion has a bearing clearance disposed between a surface of the rotating shaft and the bearing metal and filled with a lubricating solution,
   a bearing surface portion faces the surface of the rotating shaft, a plurality of pockets are recessed in the bearing surface portion adjacently to one another in a circumferential direction of the bearing surface portion, and partition plates each housed in a corresponding one of the pockets and partition a bottom portion of the pocket from the surface of the rotating shaft,
   clearances are each formed between the partition plate and an edge of the pocket in a rotating direction of the rotating shaft,
   the clearances are formed in the pocket at upstream and downstream ends of the partition plate in the rotating direction,
   the bearing clearance includes a first bearing clearance between the surface of the rotating shaft and the bearing surface portion and a second bearing clearance between the surface of the rotating shaft and the partition plate, and
   the second bearing clearance is larger than the first bearing clearance,
   wherein
   the partition plate and the bearing metal are formed of different materials, and the partition plate is formed of a material having a lower strength than a material of the bearing metal.

8. The hydrostatic bearing apparatus according to claim 7, wherein when a density of the lubricating solution is denoted by $\rho$, a viscosity coefficient of the lubricating solution is denoted by $\mu$, a peripheral velocity of the rotating shaft is denoted by U, and a size of the second bearing clearance is denoted by H, a Reynolds number for the second bearing clearance is expressed by $Re=\rho UH/\mu$, and for a flow of the lubricating solution occurring through the second bearing clearance when the rotating shaft is rotatably supported, $Re<2000$.

9. The hydrostatic bearing apparatus according to claim 7, wherein the lubricating solution is water, or a water solution in which 90% or more of its composition is water, or low-viscosity mineral oil.

10. The hydrostatic bearing apparatus according to claim 7, wherein the lubricating solution flowing through the second bearing clearance when the rotating shaft is rotatably supported forms a laminar flow along the rotating direction of the rotating shaft, and the lubricating solution flowing through a third bearing clearance between the bottom portion of the pocket and the partition plate forms a flow in a direction opposite to the rotating direction of the rotating shaft.

11. A machine-tool main-spindle apparatus comprising the hydrostatic bearing apparatus according to claim 7.

\* \* \* \* \*